United States Patent [19]

Held

[11] Patent Number: 4,526,737

[45] Date of Patent: Jul. 2, 1985

[54] METHOD OF MAKING MOLDED ARTICLES

[76] Inventor: Kurt Held, Alte Strasse 1, D-7218 Trossingen 2, Fed. Rep. of Germany

[21] Appl. No.: 458,013

[22] Filed: Jan. 14, 1983

[30] Foreign Application Priority Data

Jan. 14, 1982 [DE] Fed. Rep. of Germany ....... 3200914

[51] Int. Cl.[3] ........ B29G 7/00

[52] U.S. Cl. ........ 264/112; 264/109; 264/122; 264/123

[58] Field of Search ........ 264/122, 123, 109, 112

[56] References Cited

U.S. PATENT DOCUMENTS

| | | | |
|---|---|---|---|
| 2,033,411 | 3/1936 | Carson | 264/122 |
| 2,543,101 | 2/1951 | Francis, Jr. | 264/122 |
| 2,870,110 | 1/1959 | Cooper et al. | 264/109 |
| 3,188,367 | 6/1965 | Gottschalk | 264/109 |
| 3,207,819 | 9/1965 | Raddin et al. | 264/109 |
| 3,442,999 | 5/1969 | König et al. | 264/109 |
| 3,950,472 | 4/1976 | Su | 264/122 |
| 3,969,454 | 7/1976 | Thornber et al. | 264/122 |
| 4,257,995 | 3/1981 | McLaughlin et al. | 264/122 |
| 4,405,542 | 9/1983 | Greer | 264/122 |

*Primary Examiner*—Jeffery Thurlow
*Assistant Examiner*—Patrick Dailey
*Attorney, Agent, or Firm*—Toren, McGeady, Stanger

[57] ABSTRACT

In a method of making molded articles, such as particleboard from mixtures of wood chips or like particles, bonding agents and reaction accelerators, initially the particles are divided into two portions A and B. Portion A is wetted with bonding agents and portion B is wetted with reaction accelerators. The two portions A and B are maintained separate until they are mixed loosely layered together and introduced randomly into a mold forming a mat. Within the mold, the mat formed by the particles of portions A and B are pressed together and the pressing action triggers the reaction hardening. Prior to the pressing step, the mutual contact of the particles in the mat of portions A and B causes only limited hardening bridges.

10 Claims, No Drawings

METHOD OF MAKING MOLDED ARTICLES

SUMMARY OF THE INVENTION

The present invention is directed to a method of making molded articles such as particleboard or fiberboard made up of a material mixture of wood chips or fibers, woody vegetable matter or plant matter or mineral fibers with the addition of organic bonding agents and reaction accelerators. Further, the method may include the addition of heat to the material to be molded.

Generally, it is known to accelerate the setting process, such as in the production of particleboard, by utilizing thermosetting bonding agents or binders, such as urea resin, melamine resin or phenolic-formaldehyde resin and by supplying heat during the pressing or molding operation. Further, hardening accelerators are regularly added to the bonding agent solution and these accelerators, by themselves or in combination with the supplied heat, accelerate the bonding agent hardening and, as a result, the production process.

Since the acceleration of the bonding agent hardening by heating is limited with regard to the thermal stability of the particle bonding agent mixture, and also because of the poor heat conductivity of most particleboard and fiberboard raw materials, a considerable number of procedures have been suggested to improve the heat conductivity of the particle mat chip cakes or the transference of heat by steam or hot air, or to apply the heat to the particle mat at the time that it is formed, or to produce the heat within the mat. All of these methods which make up the prior art are limited with respect to additional acceleration of the bonding agent hardening, because of the requirement that the bonding agent should first be converted to the gelatiniform state, that is, to the final molecular structure, when the resin fiber matrix or the resin chip matrix is compressed so that the material and the bonding agent have reached their final condition relative to one another and within the molded article.

It is the primary object of the present invention to overcome the limitations experienced in the past and to provide a further reduction in the hardening time possibly with the application of heat to the hardening process. The addition of heat may be reduced or eliminated if there is any question concerning its usefulness.

In accordance with the present invention, the particles to be compressed are divided into two portions, A and B. Portion A is wetted with the bonding agent while portion B is wetted with the reaction accelerator. Both portions are maintained separate from one another. The two portions are then introduced into the mold in a random manner so that a uniform loose mixture is achieved. Finally, the particle mixture made of portions A and B is pressed together within the mold for triggering the reaction hardening. Accordingly, the molded article, such as particleboard or fiberboard is produced in the method with the individual chips or fibers connected together by means of the fluid or thermoplastic bonding agents. An irreversible hardening effect is obtained when the particle mat is compressed within the mold. During the molding operation heat may be applied. The purpose of the invention is the acceleration of the hardening process and the interconnection of the individual particle for increasing the quantity produced per unit of time.

In the present invention, the particle mat or fibers from which the molded articles are formed are made up of two different particle or fiber portions A and B. The material of portion A is wetted with the bonding agent by distributing the individual particles of portion A in suitably selected relation to one another. The surfaces of the individual particles of portion B are wetted with an accelerator of high chemical reactivity. The particles of portion A can be in the range of 30–70% of the material being molded while the particles of the portion B can be in the range of 70–30% of the material being molded.

The mat to be molded is originally formed using known scattering machines with the individual particles of portions A and B falling in a random manner to make up the cake. The portions A and B are distributed in a uniformly mixed arrangement and a certain hardening of the bonding agent of the individual particles of portion A occurs at the points of contact with the particles of portion B, however, since the cake is formed in a layered or laminated way so that it is very bulky and loose, the number of these hardening bridges, though they are undesirable, is low and does not affect the formation of the molded article.

The mat loosely formed by the portions A and B is compressed in a known manner so that the areas of contact between the individual particles of portion A and portion B rapidly increases to the extent established by the pressing action and the bonding agent, in accordance with the selected reactivity of the accelerator, and passes rapidly and uniformly over the volume of the article to be molded.

The method embodying the present invention is especially effective if the material in the loose state is heated before or during the formation of the particle mat at a temperature favorable to the bonding agent accelerator according to known methods. By supplying heat in this manner it does not lead to a pre-curing of the bonding agent, except at the relatively few points of contact between the individual particles of portion A and portion B. Instead, the effect provided by the heat occurs at the point in time which is favorable for effecting the compression of the individual particles making up portion A and portion B of the article to be molded.

It is possible to vary the method of the present invention to achieve a particle desired effect. Accordingly, it may be advisable to apply the bonding agent to the individual particles of part A where the particles are graded in a particular manner and to apply the accelerator to the individual particles of portion B where the individual particles are sorted to provide particularly fine-grained or elongated particles as compared to the particles making up portion A. Further, it is also possible to introduce a fiber or another similar form of material, such as fine leaves, into the particle mat where such material serves only as a carrier for the accelerator, or reinforcing means can be added, such as glass fibers, which are incorporated into the molded article. These various modifications of the method are included in the present invention which involves bringing together the bonding agent and the accelerator within the material to be molded only at the last possible moment so that the interaction of the bonding agent-accelerator mixture takes place with the shortest reaction times.

The advantages of the method embodying the present invention are obvious. The rapid hardening reaction begins, with the exception of the few harmless contact points in the material loosely poured into the mold, with the compression of the particle mat at the time in the process which is most favorable for achieving the desired object. Since the individual particles of portions A and B and, therefore, the bonding agent and the accelerator, do not contact one another, the influence of time and temperature on the particle mat before it is compressed or molded is less critical, as is the activity of the selected accelerator.

Moreover, since heat can be supplied to the particle mat to be molded before or during the molding operation, the heat is immediately available at the commencement of the hardening process and acts without any time delay required for its introduction. It is sufficient to maintain the pressing surfaces at a temperature which prevents the discharge of heat during the pressing operation. Undesirable effects of the heated pressing surfaces on the surface of the molded article and on the pressure do not occur within the interior of the article.

The following is one example of the procedure carried out in performing the present invention. The material used to form the molded article is a combination of chopped wood chips and fine fibers. The chopped wood chips form portion A and the fine fibers form portion B. 100 kg of portion A with a residual moisture of 4% are mixed with 16 kg of a 50% hydrous solution of urea resin in a spray mixer. The particles of portion A are placed in a scattering machine with careful drying at 5–7% residual moisture. The scattering machine distributes or scatters, in a known manner, the individual particles making up portion A and these particles are coated with the bonding agent. Similarly, a second scattering machine distributes the individual particles of portion B made up of 20 kg of fine fibers with 5–7% residual moisture. The scattering machine places the particles from both portion A and portion B into a particle mat built up in one or more layers within a mold or similar structure. The fine fibers are sprayed, separately from and parallel to the preparation of the chopped wood chips of portion A, with 0.8 kg of a 20% hydrous solution of ammonium chloride as the accelerator. The individual particles of portion B are introduced from the second scattering machine which mixes them into the stream from the first scattering machine supplying the individual particles of portion A. The individual particles of portion A and portion B are introduced at the same time and in proportion to the abovementioned weights. It is important that the individual particles of part A and of part B mix in this particular proportion in free-fall and make up a loose particle mat which is then compressed in a pressing or molding operation and subjected to the full reaction acceleration.

While specific embodiments of the invention have been shown and described in detail to illustrate the application of the inventive principles, it will be understood that the invention may be embodied otherwise without departing from such principles.

I claim:

1. In a method of molding particleboard or fiberboard from wood and plant matter particles and mineral fibers comprising:

(a) blending said particles with an organic bonding agent, a polycondensation hardening agent and a reaction accelerator for said hardening agent, (b) placing a mat layer of said mixture within a heated pressing means, (c) pressing said mat to bond the particles into said board form, the improvement comprising:

(d) prior to step (a) separating the particulate material into two portions A and B, (e) wetting the surface of the portion A particles only with the bonding agent, (f) wetting the surface of the portion B particles only with the reaction accelerator, (g) introducing the particles of the portion A and the portion B separately and in a random manner into a mold forming a loosely layered mat, and (h) compressing the loosely layered mat formed of the portions A and B within the mold to intimately associate the materials and thereby initiate the reaction of the accelerator, and compact and bond the particles into a molded board.

2. Method, as set forth in claim 1, wherein the particles of the portion A being in the range of 30–70% of the material being molded and the particles of the portion B being in the range of 70–30% of the material being molded.

3. Method, as set forth in claim 1, including heating the particles of portion A and portion B at least during the introduction of the particles of portion A and portion B into the mold.

4. Method, as set forth in claim 1, including using wood chips for portion A and fibers for portion B.

5. Method, as set forth in claim 1, including introducing a fiber into the mold along with the particles of portion A and portion B with the fibers serving as a carrier for the accelerator.

6. In a method for molding particleboard or fiberboard from wood and plant material particles and mineral fibers comprising (a) blending said particles with an organic bonding agent, a polycondensation hardening agent and a reaction accelerator for said hardening agent, (b) placing a mat layer of said mixture within a heated pressing means, (c) pressing said mat to bond the particles into said board form, the improvement comprising:

(d) prior to step (a) separating the particulate material into two portions A and B forming portion A of 100 kg of chopped wood chips having a residual moisture of 4% with 16 kg of a 50% hydrous solution urea resin, forming the portion B by mixing 20 kg of fibers with a 5–7% residual moisture with 0.8 kg of a 20% hydrous solution of ammonium chloride acting as an accelerator, introducing the particles of portion A into a first scattering device, introducing the particles of portion B into a second scattering device, introducing the particles from the first scattering device and the second scattering device in a random manner into the pressing means in the form of a loosely layered mat, compressing the loosely layered mat formed of the portions A and B within the pressing means to intimately associate the materials and thereby initiate the reaction of the accelerator, and compact and bond the particles into a molded board.

7. Method, as set forth in claim 6, introducing heat to the particles of portion A and to the fibers of portion B as the particles and fibers are being placed into the pressing means.

8. Method, as set forth in claim 6, including introducing heat only to one of the particles of portion A and of the particles of portion B as the particles in the portion to be heated are placed in the pressing means.

9. Method, as set forth in claim 6 or 7, including the step of maintaining the mold surfaces at a temperature for preventing the transfer of heat out of the particles of portion A and portion B heated at least during the introduction of the particles into the mold.

10. Method, as set forth in claim 6 or 7, including introducing glass fibers to the mold along with the particles of portion A and portion B for reinforcing the molded article to be formed.

* * * * *